(12) United States Patent
Hawkins et al.

(10) Patent No.: US 7,759,266 B2
(45) Date of Patent: Jul. 20, 2010

(54) DUAL CRIMPED WARP FABRIC FOR CONVEYOR BELT APPLICATIONS

(75) Inventors: John Hawkins, Loganville, GA (US); Geoff Normanton, Dacula, GA (US)

(73) Assignee: Fenner Dunlop Americas, Inc., Charlotte, NC (US)

( * ) Notice: Subject to any disclaimer, the term of this patent is extended or adjusted under 35 U.S.C. 154(b) by 328 days.

(21) Appl. No.: 11/827,979

(22) Filed: Jul. 13, 2007

(65) Prior Publication Data
US 2009/0014084 A1    Jan. 15, 2009

(51) Int. Cl.
*D03D 11/00* (2006.01)

(52) U.S. Cl. .................. 442/205; 442/64; 442/65; 442/148; 442/149; 442/164; 442/168; 442/182; 442/183; 442/203; 442/206; 442/207; 442/208; 442/209; 442/213; 442/215; 442/216; 442/218; 442/220; 442/286; 156/148

(58) Field of Classification Search .......... 428/64, 428/65, 148, 149, 164, 168, 182, 183, 203, 428/205, 206, 207, 208, 209, 213, 215, 216, 428/218, 220, 286; 156/148
See application file for complete search history.

(56) References Cited

U.S. PATENT DOCUMENTS

| | | | |
|---|---|---|---|
| 1,737,218 | A | 11/1929 | Coombes |
| 2,273,246 | A | 2/1942 | Anderson |
| 2,949,134 | A | 8/1960 | Hindle et al. |
| 3,148,710 | A | 9/1964 | Rieger et al. |
| RE26,731 | E | 12/1969 | Robinson |
| 3,556,892 | A | 1/1971 | Hilliard, Jr. |
| 3,957,090 | A | 5/1976 | Muhlen et al. |
| 4,094,402 | A * | 6/1978 | Heeke .................. 198/847 |
| 4,407,333 | A | 10/1983 | Fowkes |
| 4,469,142 | A | 9/1984 | Harwood |
| 4,518,647 | A | 5/1985 | Morrison |
| 4,813,533 | A | 3/1989 | Long |
| 4,870,998 | A | 10/1989 | Westhead |
| 4,958,663 | A | 9/1990 | Miller et al. |

(Continued)

OTHER PUBLICATIONS

Form PCT/ISA/220 International Search Report for Application No. PCT/US2008/066723 filed on Jun. 12, 2008.

(Continued)

*Primary Examiner*—Andrew T Piziali
(74) *Attorney, Agent, or Firm*—Shumaker, Loop & Kendrick, LLP

(57) ABSTRACT

A conveyor belt reinforcing fabric weave is disclosed, having a plurality of center tension warps crimped about a plurality of middle wefts. Upper and lower wefts lie above and below the middle wefts. The upper and lower wefts are in opposition to each other and in non-opposition with the center wefts. Binder warps are interlaced above and below the central tension warps in alternating sequence, with at least one of the binder warps interlacing upper and lower wefts other than those interlaced by an adjacent binder warp. Interlacing of the middle wefts by the central tension warps locks the wefts in place, providing enhanced resistance to faster pullout. The lack of straight tension warps provides a highly flexible fabric that can be used in multi-ply applications. A conveyor belt incorporating one or more plies of the inventive fabric is disclosed, as is a method for manufacturing the belt.

26 Claims, 4 Drawing Sheets

U.S. PATENT DOCUMENTS

| | | |
|---|---|---|
| 4,960,349 A | 10/1990 | Willibey et al. |
| 5,091,247 A | 2/1992 | Willibey et al. |
| 5,134,006 A | 7/1992 | Irvin |
| 5,540,983 A | 7/1996 | Maris |
| 6,427,728 B1 | 8/2002 | Maguire et al. |
| 7,059,357 B2 | 6/2006 | Ward |

OTHER PUBLICATIONS

Form PCT/ISA/237 Written Opinion for Application No. PCT/US2008/066723 filed on Jun. 12, 2008.

* cited by examiner

DUAL CRIMPED WARP FABRIC FOR CONVEYOR BELT APPLICATIONS

FIELD OF THE INVENTION

The invention generally relates to an improved fabric for use in conveyor belt carcass applications, and more particularly to a design for a high strength fabric having a dual crimped warp weave for providing enhanced mechanical fastener holding and improved modulus control for conveyor belt carcasses.

BACKGROUND

Conveyor belts and conveyor systems are well known systems used for the transport of a variety of materials and products. Conveyor belts are designed and used in heavy materials transport such as coal mining and cement manufacturing operations, and in medium and light weight applications such as light materials handling operations, package handling and transport, and the like. For heavyweight applications, it is desirable to provide a belt with high strength, and also one that will resist damage due to impacts with the material being carried, such as where high volumes of hard, sharp or irregular-shaped product are loaded on the belt.

Current high-strength belts are often built from fabrics employing a "straight warp" weave design, in which the warp yarns or cords are not crimped along their lengths but remain substantially straight. Since the tension members in these straight warp weaves do not intertwine with the wefts, they do not help to lock the wefts in place to resist weft pullout when tension is applied to the belt via the conveyor belt fastener lacings.

Further, although the un-crimped arrangement of the warps in straight warp weave designs provide the belt with an extremely high modulus of elasticity in the running direction (the resulting belt will therefore undergo minimal stretch even when subjected to the high tensile loads applied by the conveyor system pulleys), such high strength brings with it high stiffness. This can be a problem where the belt is required to bend around the tight radius of a return-idler or tail-pulley. Thus, to ensure that adequate flexibility, the total number of reinforcing fabric "plies" may be limited to only one or two, which disadvantageously limits the total strength of the resulting belt.

Thus, there is a need for a high-strength conveyor belt carcass design that has enhanced resistance to fastener lacing pullout, and also has increased flexibility as compared to traditional straight warp designs. Such a design should enable the building of conveyor belts with three or more fabric plies to enhance belt strength, while retaining sufficient flexibility to enable the belt to bend around the relatively tight radii of the conveyor system tail pulleys and/or return idlers. The design should have a high stretch resistance, excellent fastener holding strength, and high resistance to tearing, when subjected to high tensile forces imparted by the conveyor system.

SUMMARY OF THE INVENTION

The disadvantages heretofore associated with the prior art are overcome by the inventive design for a conveyor belt having a fabric carcass comprising a dual crimped warp arrangement. The inventive design provides advantages including, enhanced flexibility with high strength, enabling the building of very high strength multi-ply carcasses.

A high strength flexible reinforcing fabric is disclosed for use in a conveyor belt structure. The fabric may comprise a plurality of substantially parallel middle wefts, and a plurality of substantially parallel upper and lower wefts positioned above and below said center wefts, the upper and lower wefts being in opposition to each other, the upper and lower wefts further being in non-opposition with the center wefts. The fabric may further comprise a plurality of crimped central tension warps positioned transverse to said middle wefts, the central tension warps interlacing each of the middle wefts. The fabric may also comprise a plurality of binder warps interlacing the upper and lower wefts above and below the central tension warps in alternating sequence with at least one of the binder warps interlacing upper and lower wefts other than those interlaced by an adjacent binder warp. The fabric may be substantially devoid of straight tension warp members.

A conveyor belt is disclosed, comprising a first reinforcing fabric layer, a top elastomer cover layer; and a bottom elastomer cover layer. The first reinforcing layer may comprise a plurality of substantially parallel middle wefts, and a plurality of substantially parallel upper and lower wefts positioned above and below said center wefts. The upper and lower wefts may be in opposition to each other, while the upper and lower wefts may further be in non-opposition with the center wefts. The first reinforcing layer may further comprise a plurality of crimped central tension warps positioned transverse to said middle wefts, said central tension warps interlacing each of the middle wefts. The first reinforcing layer may also comprise a plurality of binder warps interlacing the upper and lower wefts above and below the central tension warps in alternating sequence with at least one of the binder warps interlacing upper and lower wefts other than those interlaced by an adjacent binder warp. The first reinforcing layer may be free of straight tension warp members.

A method of making a conveyor belt structure is disclosed, comprising: (a) providing a first reinforcing fabric layer having: (i) a plurality of substantially parallel middle wefts; (ii) a plurality of substantially parallel upper and lower wefts positioned above and below said center wefts, the upper and lower wefts being in opposition to each other, the upper and lower wefts further being in non-opposition with the center wefts; (iii) a plurality of crimped central tension warps positioned transverse to said middle wefts, said central tension warps interlacing each of the middle wefts; and (iv) a plurality of binder warps interlacing the upper and lower wefts above and below the central tension warps in alternating sequence with at least one of the binder warps interlacing upper and lower wefts other than those interlaced by an adjacent binder warp; wherein the first reinforcing fabric layer has no straight tension warp members. The method may further comprise (b) impregnating the reinforcing fabric layer with an elastomer; and (c) providing top and bottom elastomer covers.

BRIEF DESCRIPTION OF THE DRAWINGS

The details of the invention, both as to its structure and operation, may be obtained by a review of the accompanying drawings, in which like reference numerals refer to like parts, and in which.

DETAILED DESCRIPTION

A new conveyor belt design is disclosed for use in applications where high strength and high flexibility are desired. The belt design employs a carcass integrating one or more layers of fabric having a dual crimped warp configuration in which the warp yarns are woven around center placed weft yarns. The warps and wefts are locked together by multiple binder warps, thus providing the belt with enhanced strength while retaining substantial flexibility.

Figure 1A:
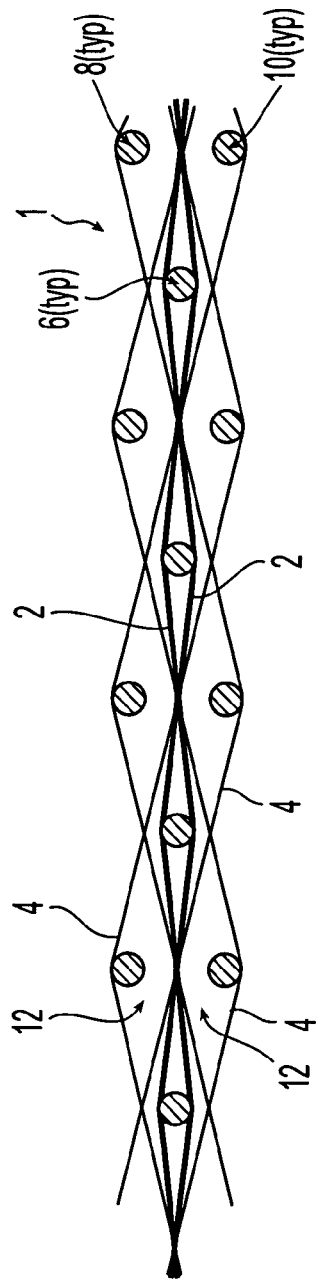
FIG. 1A is a cross-section view of the inventive reinforcing fabric weave.
Figure 1B:
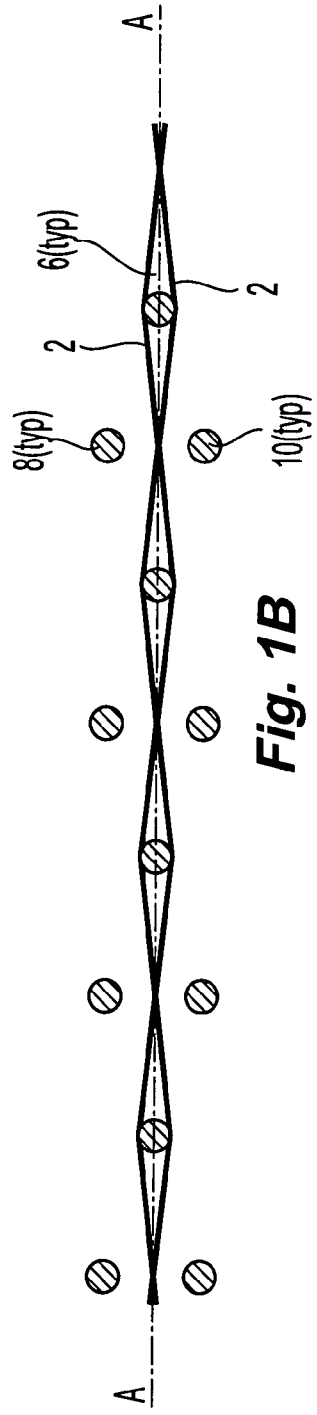
FIG. 1B is a partial cross-section view of the weave of FIG. 1A, showing only the central warps woven around the central wefts.
Figure 1C:
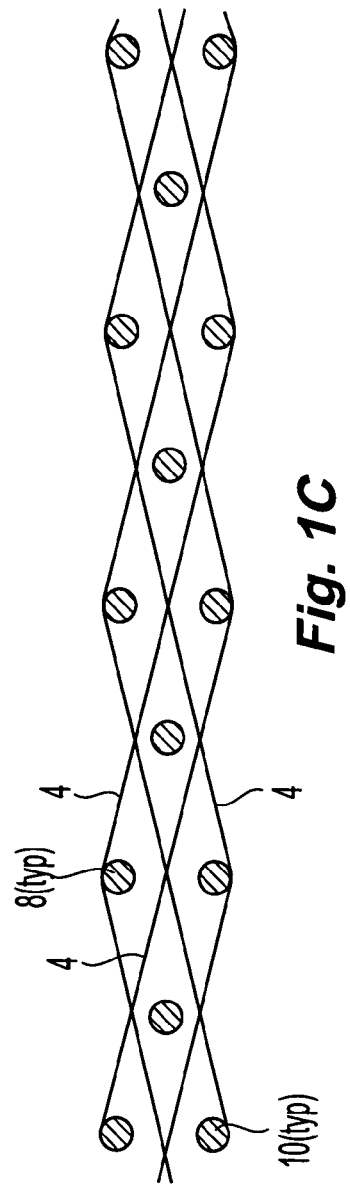
FIG. 1C is another partial cross-section view of the weave of FIG. 1A, showing only the binder warps woven around the upper and lower wefts.

Referring to FIG. 1A, fabric layer 1 is comprised of a plurality of central tension warps 2, a plurality of binder warps 4, a plurality of middle wefts 6 and a plurality of upper and lower wefts 8, 10. All of the wefts 6, 8, 10 are either uncrimped or very slightly crimped), while all of the warps 2, 4 are crimped about one or more of the wefts 6, 8, 10. Specifically, the central tension warps 2 are woven about the middle wefts 6 (FIG. 1B), while the binder warps 4 are woven about the upper and lower wefts 8, 10 (FIG. 1C). The weaving of the central tension warps 2 around the middle wefts 4 locks the tension warps and the middle wefts together, and also provides desired flexibility in the longitudinal direction (due to the crimping of the warps). The weaving of the binder warps 4 about the upper and lower wefts 8, 10 locks the entire structure together, while retaining the aforementioned longitudinal flexibility. This weave scheme results in a reinforcing fabric having good flexibility due to the crimping of all of the warps. Since the crimping of the central tension warps 2 is slight, however, the fabric will retain substantial strength in the longitudinal direction. The fabric layer 1 will also have high strength in the lateral direction due to the straight weft configuration, and will have a high resistance to longitudinal tearing and fastener pullout due to the highly interlocked nature of the interlaced warps and wefts.

Referring again to FIGS. 1A and 1B, the central warps 2 are shown crimped in alternating fashion about the middle wefts 6, locking each middle weft 6 between adjacent central warps 2. Since the central warps 2 are crimped instead of straight, when a tensile force is applied to the end of the fabric 1 the warps 2 are able to flex slightly (to assume the configuration shown in FIG. 3), thus allowing limited stretching of the fabric 1 to enable the conveyor belt to bend around small-radius tail pulleys and return idlers. This flexibility is retained even when the belt incorporates several layers or "plies" of fabric 1 because there are no "straight" warps present that would unacceptably increase stiffness with a multi-ply buildup. This crimped tension warp design allows greater control over the tension modulus of the finished belt, thus allowing a high strength belt to be fabricated from more reinforcing fabric plies than has been possible with prior art designs.

Referring now to FIG. 1C, each upper weft 8 is positioned directly over an associated lower weft 10, and the binder warps 4 are interlaced about the wefts 8, 10 to bind the fabric layer 1 together. Specifically, each binder warp 4 laces around an upper weft, skips the adjacent lower weft and then laces around the subsequently adjacent lower weft 10, in alternating sequence. Thus, each binder warp 4 interlaces upper and lower wefts 8, 10 that are not interlaced by the adjacent binder warp 4.

The central tension warps 2 may have a crimp from about 2% to about 15%. The binder warps 4 may have a crimp from about 4% to about 35%. The middle, upper and lower wefts 6, 8, 10 may have a crimp of about 1% to about 5%. The crimping level (i.e., % crimp) of the central tension warps 2 and the binder warps 4 can be adjusted to create a belt having a variety of strength characterisitcs. Thus, where the crimping level between the tension and binder warps 2, 4 is close (e.g, 2% and 4%, respectively), the tension and binder warps will substantially share tension loads and the resulting belt will have high strength with comparatively lower weight. Where the crimping level between the tension and binder warps 2, 4 is substantially different (e.g., 5% and 35%, respectively), the tension warps 2 will bear a higher proportion of the load than the binder warps 2, 4, and the resulting belt may have greater flexibility. Thus, for multi-ply belt designs, a weave may be provided with a greater difference in crimping levels between the tension and binder warps to retain a desired flexibility.

It will be appreciated that in addition to benefits of high strength and improvide flexibility, the inventive weave also provides important impact protection for the central strength members of the carcass—the central tension warps 2. From the figures it can be seen that associated upper and lower wefts 8, 10 are stacked (i.e., the upper weft 8 lies directly above the lower weft 10 when viewed from the side). These stacked wefts, however, are positioned along longitudinal axis A-A of the fabric (i.e., the axis that will be parallel to the running direction of the finished belt) so that they lie "between" adjacent middle wefts 6 and so are not in direct opposition to any of the middle wefts 6. This reduces the tendency for the central tension warps 2 to become damaged when the fabric 1 is subjected to a crushing blow as can result where the wefts above and below the warps were located in direct opposition. This allows, for example, the upper weft 8 to flex inward toward the lower weft 10 when an impact is applied, without impinging upon the central tension warps 2 in a manner that causes harm. If the wefts 6, 8, 10 were stacked directly upon each other, as in prior designs, impact loads experienced by the upper weft 8 would be directly transmitted through to the middle and lower wefts 6, 10, pinching the central tension warps 2 and damaging them. With the inventive offset weft arrangement, any movement in the upper weft 8 caused by impacts can be accommodated without translating in any substantial way to the central tension warps 2.

Furthermore, during belt fabrication, the spaces 12 (FIG. 1A) directly opposite each upper and lower weft 8, 10 become filled with elastomeric material. These elastomeric areas provide an impact absorbing cushion opposite each weft 8, 10 which further reduces the danger of crushing the inner warps 2 and wefts 6.

Figure 2:
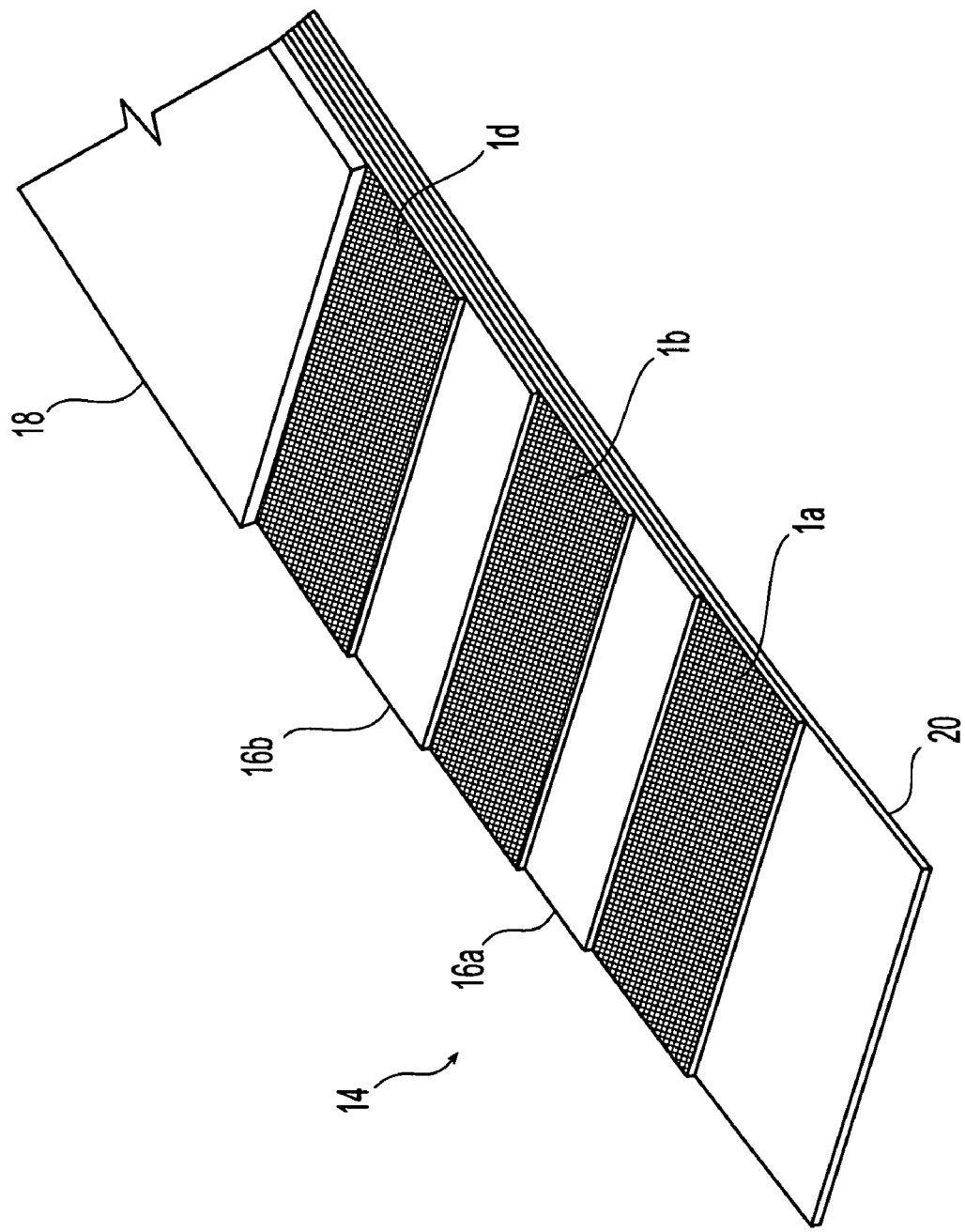
FIG. 2 is an exploded perspective view of an exemplary conveyor belt incorporating a plurality of reinforcing layers each comprising the inventive reinforcing weave of FIG. 1.

As previously noted, providing a weave with central tension warps 2 having a moderate crimp allows for efficient utilization of the warp yarns' tensile strength while exploiting the flexibility inherent in a crimped warp design. Likewise, providing a fabric layer 1 with only slightly crimped (or uncrimped) wefts 6, 8, 10 results in a belt having maximum lateral strength per unit of belt weight and cross sectional area, and allows good control of the lateral stretch properties of the belting fabric. The resulting fabric layer 1 can be built up in multiple plies to form a high strength conveyor belt having desired lateral and longitudinal strength, and which is also flexible enough to bend around small-radius tail pulleys and return idlers of the conveyor system. An exemplary multiply conveyor belt 14 is illustrated in FIG. 2. Belt 14 comprises first, second and third fabric layers 1*a, b, c,* separated by intervening elastomer layers 16*a, b* that bond the fabric layers together. Also shown are top and bottom cover elastomer layers 18, 20. Although not shown in FIG. 2, it will be appreciated that the individual fabric layers 1*a, b, c* are impregnated or saturated with elastomeric material. This elastomeric material may enhance cohesion of the belt, but it also may serve the important purpose of filling spaces 12 (FIG. 1A) to provide the aforementioned cushioning effect in response to material impact loads.

Figure 3:
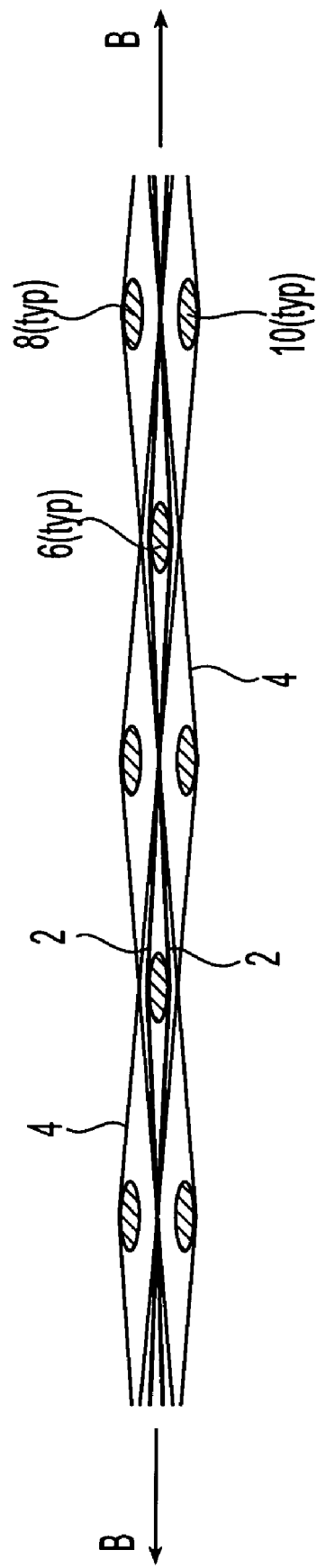
FIG. 3 is a cross-section view of the inventive reinforcing fabric weave of FIG. 1, subjected to a tensile force.

A substantial benefit of the inventive fabric layer 1 is that tensions applied to the fabric (i.e., the belt) under normal operational loading tends to further bind the fabric 1 together. Referring to FIG. 3, the application of high tensile forces (shown as arrows "B") tends to displace the warps 2, 4 and wefts 6, 8, 10 of the fabric, inducing a mutual embedding and crimping of each component resulting in a mutually locked structure to offset the deforming tensile force. The induced locking in the warps 2, 4 and wefts 6, 8, 10 and in the warps and binder intersections resists further displacement of the fabric components. Concurrently, the angle of the binder warps with respect to the axis A-A of the belt is reduced thereby increasing the contribution of the binder warp 4 to the tensile strength of the belt. This may be particularly significant because it greatly enhances mechanical fastener holding strength.

The warps 2, 4 may comprise any of a variety of multifilament or monofilament structures. Further, the central tension warps 2 may be of the same or different size and/or design as the binder warps 4. In a preferred embodiment, the warps 2, 4 and wefts 6, 8, 10 all comprise "S" twist yarns. In another embodiment, the warps 2, 4, may comprise alternate twist plied yarn (i.e., yarn having alternating "S" twist segments and "Z" twist segments) as described in U.S. Patent Application Publication No. 2004-0050031 to Gilbos et al., titled "Yarn Package," and filed Dec. 21, 2001, the entirety of which application is incorporated by reference herein. Alternatively, the warps 2, 4 may individually comprise "S" or "Z" twist yarns. Further, the warps 2, 4 may not all be of the same design (size, twist, material, number of strands, etc.). For example, some of the warps 2, 4 of the fabric layer 1 may have an "S" twist configurations while other warps 2, 4 of the same woven layer may have a "Z" twist configuration. In addition, the warps 2, 4 may comprise alternating polymer types, such as polyester, nylon, glass, and the like. Additionally, where multiple plies of fabric are used in a belt 14, the warps 2, 4 of one fabric layer may be the same or different from the warps of the other fabric layer(s).

The wefts 6, 8, 10 likewise may be any appropriate multifilament or monofilament structure. Further, the middle wefts 6 may be of the same or different size and/or design as the upper and lower wefts 10. Where monofilaments are used, they may comprise any of a variety of sized monofilament structures. It is also contemplated that the wefts may comprise alternating mono and multi-filaments to provide a controlled degree of lateral stiffness. In addition, the wefts may comprise alternating polymer types, such as polyester, nylon, glass, and the like. Thus, adjacent wefts can comprise alternating mono- and multi-filaments and/or alternating material types, to provide a finished belt 14 having the desired strength and stiffness characteristics.

The finished conveyor belt 14 may be constructed from a variety of different plies of fabric. Thus, although the embodiment illustrated in FIG. 2 shows a belt 14 comprising three plies of fabric incorporating the inventive weave, greater or fewer plies may also be provided. Additionally, it may be desirable to incorporate additional traditional weave layers along with the fabric layer 1. For example, a finished belt 14 may comprise two plies of the inventive fabric layer 1, along with one or more layers of reinforcing fabric having a traditional plain weave, or other known weave configuration.

The fabric layer 1 may then be immersed in, or spray coated with, an adhesion promoter such as resorcinol formaldehyde latex (RFL). After curing of the adhesion promoter (such as by heating), the fabric layer 1 may be incorporated into a belt structure through the application of a suitable elastomeric material. A variety of techniques may be used to apply the elastomeric material, including dipping, calendaring, knife coating, extrusion coating or combinations thereof. Typically, a dipping process in which the fabric layer 1 is submerged in a liquid elastomer will be sufficient to achieve a desired level of impregnation of the layer with the elastomer. In some instances, it may be desirable to apply a vacuum or other appropriate technique to facilitate impregnation of the carcass with the elastomer. Alternatively, dipping may be coupled with agitation such as by passing the fabric layer 1 through a squeegee/roller system. As noted, calendaring may also be used, in combination with dipping/agitation to ensure the elastomeric material penetrates the weave of the fabric layer 1.

The elastomer application process may further be adjusted to customize the degree of penetration of the elastomeric material into the fabric layer 1 and also to control the thickness of the covers 18, 20. This may be important because the type of elastomer and the degree of penetration of the elastomer within the carcass are expected to affect the ultimate strength of the finished belt.

The finished belt 14 may also be provided with covers 18, 20 having customized profiles for enhancing coefficient of friction for engagement with the conveyed material. For example, surface finishes (smooth, or semi-smooth) may be achieved by passing the belt 14 through a smooth or lightly-textured calender roll. To provide a high textured surface, a rigid mold (e.g., metal platen), a flexible pressure pad or an impression fabric can be used. Such surface texturing may be of particular advantageous where the conveyed material is being carried up an incline.

The top bottom covers 18, 20 may be formed of the same elastomeric material used to impregnate the fabric layer(s) 1, or they may be made from a different elastomer compound. Additionally, the top and bottom covers 18, 20 may be made from different compounds and have different additives, and/or may have different surface finishes applied. This may be advantageous where a smooth surface finish is desired for the bottom surface (the one that will be in contact with the conveyor pulleys and rollers during operation) while providing a rougher finish on the top to provide good retention/holding of the materials being carried by the conveyor. It may also be desirable where heat resistance is needed for the top cover, but is unnecessary for the bottom cover.

Although the inventive weave design has been described for use in heavy duty (e.g., coal handling) applications, it may be equally advantageous for use in lightweight applications. For example, the design will find applicability in light weight package handling applications employing belts having lengths of 50 to 1,000 feet, which it will be appreciated require superior low-stretch and high tension characteristics.

Any of a variety of natural or synthetic elastomeric materials suitable for conveyor belt applications may be used as the elastomeric material. A non-limiting list of exemplary materials includes chlorosulfonyl-polyetheylene (e.g. Hypalon®), polyethylene terephthalase (e.g., Hytrel®), natural rubber, chloroprene, polychloroprene (e.g, Nitrile®), nitrile-butadiene rubber, butadiene rubber, isoprene, styrene-butadiene, modified polysiloxanes, polyester urethane, polyether urethane, polyvinyl chloride, fluorocarbon polymers, ethylene propylene rubber (EPR), and the like. In a preferred embodiment, the elastomeric material comprises polychloroprene. Additionally, different combinations of elastomers may be used within a single belt. For example, it may be desirable to use a first elastomer (e.g., PVC) to impregnate the carcass, and a second elastomer (e.g., Nitrile) to form the cover.

The elastomeric material may also comprise additives for enhancing flame retardancy, wear and chunk resistance, rolling resistance, aging resistance (e.g., ozone and UV resistance), and the like. Vulcanization aids, cross-linking agents, oils, accelerators, or other formation aids may also be used as appropriate.

The warps 2, 4 and wefts 6, 8, 10 may be formed from a variety of synthetic and/or natural fibers materials. Examples of appropriate materials include polyester, nylon, aramid (e.g., Kevlar®), glass, polypropylene, cellulose, wool, and the like. The warps 2, 4 and wefts 6, 8, 10 may be made from the same material, or they may be made from different materials. In one embodiment, the central tension warps 2 are made from polyester, while the binder warps 4 and the wefts 6, 8, 10 are made from nylon.

The warps 2, 4 and wefts 6, 8, 10 also may be provided in a variety of sizes, depending on the particular application. Thus, the center tension warps 2 may be from about 2,000 denier to about 50,000 denier, the binder warps 4 may be from about 1000 denier to about 10,000 denier, and the middle, upper and lower wefts 6, 8, 10 may be from about 1,000 denier to about 25,000 denier.

The noted size ranges for the warps and wefts may refer to yarns made up of multiple strands. For example, a 2,000 denier tension warp 2 may comprise a 2-ply yarn with each ply comprising a 1000 denier strand, while a 50,000 denier tension warp 2 may comprise a 50-ply yarn with each ply comprising a 1000 denier strand. Additionally, a warp multifilament may comprise a 1000 denier "bundle" having a filament count of 198. Alternatively, a 1300 denier bundle having a 100 filament count could be used. As will be appreciated, a variety of filament sizes and counts can be used to provide a desired strength and flexibility for the finished belt 14.

Further, while 1000 or 1260 denier yarns may most often be used to achieve a final warp and weft "size," Aramid materials could be provided in 3000 denier sizes, and staple fibers could be provided in a variety of different sizes. It will, therefore, be appreciated that multiple ply/denier combinations may be employed to achieve a desired size for each warp and weft. In one exemplary embodiment, the central tension warps 2 and binder warps 4 are 1000 denier, while the wefts 6, 8, 10 are 1260 denier.

The warps and wefts may be selected to result in a variety of fabric weights, depending on the application. For coal handling applications, each fabric layer 1 may be from about 25 ounces per square yard (ospy) to about 130 ospy, and more preferablty from about 40 ospy to about 100 ospy.

Figure 4A:
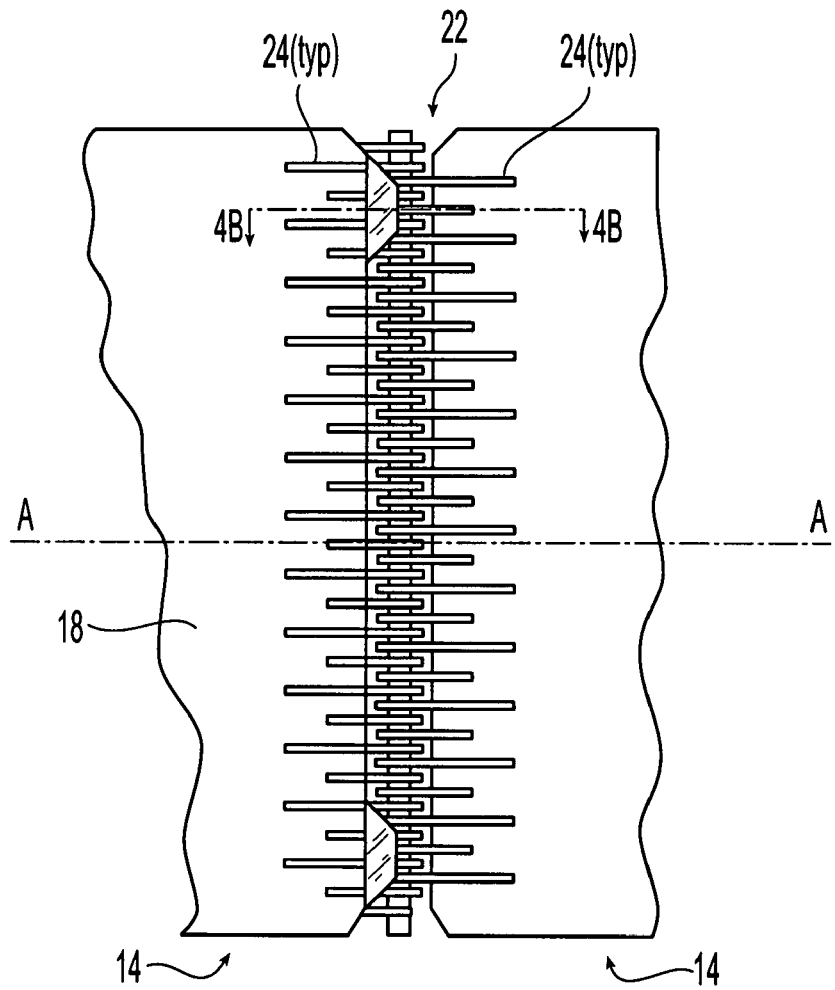
FIG. 4A is a plan view of an exemplary fastener joint for use with the conveyor belt of FIG. 2.
Figure 4B:
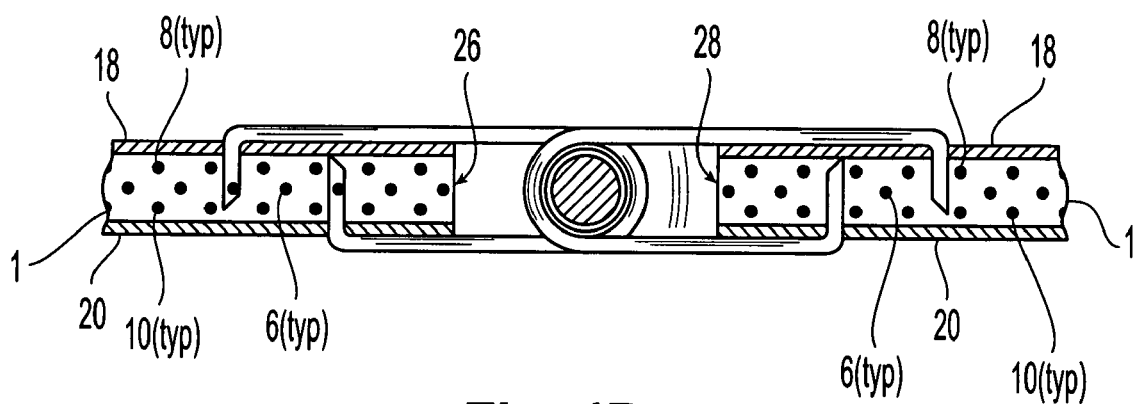
FIG. 4B is a cross-section view of the joint of FIG. 4A, showing the interaction between fastener fingers and the wefts of the inventive reinforcing fabric weave.

An exemplary belt fastener joint is shown in FIGS. 4A and 4B, illustrating the orientation of the wefts 6, 8, 10 for opposing pullout in response to a force applied by the splice joint laces. In the illustrated embodiment, a single ply fabric layer 1 can be seen comprising a plurality of middle, upper and lower wefts 6, 8 10, each having an axis substantially perpendicular to the longitudinal axis A-A of the belt 14. The fastener joint 22 comprises a series of laces 24 that penetrate the belt 14 to hold the opposing ends 26, 28 of the belt 14 in close relation. During operation, high pullout forces transmitted to the belt through the laces 24 may cause the belt to break or may cause the wefts of the reinforcing layer to pull apart, resulting in shortened belt life or failure. The interlocked nature of the warps 2, 4 and wefts 6, 8, 10 in the inventive reinforcing fabric result in enhanced fastener retention because all of the wefts (which are disposed substantially orthogonal to the laces 24 of the joint fastener) are crossed at numerous points by the binder warp 4 and the middle wefts are locked by the central tension warp 2 (FIG. 1A). Additionally, as previously mentioned, the tensile forces applied to the belt ends during operation cause the fabric weave to compress and tighten, which serves to lock the warps and wefts together even tighter, providing substantial resistance to weft pullout.

Advantageously, the disclosed fabric 1 can be incorporated into a continuous belt-manufacturing process. If a single ply belt is to be manufactured, then one fabric layer may be rolled out and treated with an adhesion promoting material such as RFL. This elastomer pretreatment may facilitate bonding between the plies and the subsequently-applied elastomeric component, and also to help lock the weave (the warps and wefts) together. The layer may then be dipped into a bath of liquid elastomeric material. Alternatively, the elastomeric material could be calendered onto one or both sides of the fabric layer. The elastomer-impregnated fabric layer 1 may then be cured, and top and bottom cover layers 18, 20 formed, if desired. For multi-ply belts, multiple rolls of fabric layer 1, may be treated with an adhesion promoting material and cured. The resulting treated layers may then either be dipped into a bath of liquid elastomer, or a layer of elastomer can be calendered onto one side of one of the layers followed by a pressing of the other layer into the elastomer. The built up plies may then be cured and pressed, and top and bottom cover layers applied as desired.

Any of a variety of alternative belt fabrication techniques and processes may also be used to incorporate one or more fabric layers 1 into a suitable conveyor belt having the desired high-strength and good flexibility accorded by the inventive fabric.

Example 1

A fabric layer according to the invention was constructed in accordance with Tables I, II and III.

TABLE I

| Yarn | | Size (Denier) | # of Plies | Twist Direction | Twists per Inch | Minimum Tensile (lbf) |
|---|---|---|---|---|---|---|
| Central tension warps | Polyester | 1000 | 9 (for a total of 9000 denier) | S | 1.8 | 152 |
| Binder warps | Polyester | 1000 | 3 (for a total of 3000 denier) | S | 2.5 | 50 |
| Wefts | Nylon | 1260 | 8 (for a total of 10,080 denier) | S | 1.8 | 178 |

TABLE II

|  | Central Tension Warp Count (EPI) | Central Tension Warp Crimp (%) | Binder Warp Count (EPI) | Binder Warp Crimp | Weft Count (PPI) | Weft Crimp (%) |
| --- | --- | --- | --- | --- | --- | --- |
| STD | 19 | 4.5 | 38.0 | 30.0 | 12 | 2.0 |
| MIN | 18.7 | 3.5 | 37.4 | 27.5 | 11.5 | 1.5 |
| MAX | 19.3 | 5.5 | 38.6 | 33.5 | 12.5 | 2.5 |

TABLE III

|  | Gauge (Inches) | Weight (OPSY) |
| --- | --- | --- |
| STD | 0.140 | 59.3 |
| MIN | 0.133 | 57.8 |
| MAX | 0.147 | 60.8 |

Example 2

A fabric layer was manufactured in accordance with Table I, with the following additional characteristics:

TABLE IV

| Gauge (In.) | Opsy | Warp Count | Binder Count | Filling Count | Warp Crimp % | Binder Crimp % | Filling Crimp % |
| --- | --- | --- | --- | --- | --- | --- | --- |
| 0.140 | 60.8 | 19.5 | 39 | 9 | 7.5 | 8.75 | 1.9 |

Natural rubber top and bottom covers having thicknesses of 207 mils and 116 mils, respectively, were applied to a single fabric layer that had previously been RFL treated. Results from testing are shown in Table V below. All testing was performed in accordance with ASTM D378, "Standard Test Methods for Rubber (Elastomeric) Belting, Flat Type."

TABLE V

| Physical Characteristic | Results | Average |
| --- | --- | --- |
| Tensile Strength, PIW (pounds per inch width) | 4150, 4350, 3950 | 4150 |
| Elongation at 330 lbs |  | 1.05 |
| Tensile Transverse, PIL (pounds per inch length) | 2330, 2400 | 2365 |
| Elongation at Break (%) | 25, 25 | 25 |
| Fastener Pullout (PIW); Flexco Type F-190E (bolt/plate type fastener) |  | 1449 |
| Fastener Pullout (PIW); Flexco Type F-R5 (hinged/rivet type fastener) |  | 1660 |
| Adhesion - Top (PIL) |  | 49 |
| Adhesion - Bottom (PIL) |  | 39 |
| Transverse Belt Tear (6" wide sample) (lbs) |  | 3100 |
| Longitudinal Belt Tear (6" wide sample) (lbs) |  | 4300 |

The results show that the inventive belt design exceeds industry standards for fastener holding. For example, for belting applications in which the running tension is on the order of 330 PIW and the belt is fastened with a 190E fastener, the example belt would exceed the industry standard minimum safety rating of 4:1 (fastener pullout:running tension).

It will be understood that the description and drawings presented herein represent an embodiment of the invention, and are therefore merely representative of the subject matter that is broadly contemplated by the invention. It will be further understood that the scope of the present invention encompasses other embodiments that may become obvious to those skilled in the art, and that the scope of the invention is accordingly limited by nothing other than the appended claims.

The invention claimed is:

1. A high strength flexible reinforcing fabric for a conveyor belt, comprising:
   a plurality of substantially parallel middle wefts;
   a plurality of substantially parallel upper and lower wefts positioned above and below said center wefts, the upper and lower wefts being in opposition to each other, the upper and lower wefts further being in non-opposition with the center wefts;
   a plurality of crimped central tension warps positioned transverse to said middle wefts, said central tension warps interlacing each of the middle wefts; and
   a plurality of crimped binder warps interlacing the upper and lower wefts above and below the central tension warps in alternating sequence with at least one of the binder warps interlacing upper and lower wefts other than those interlaced by an adjacent binder warp;
   wherein the central tension warp crimp is different from the binder warp crimp and the fabric has no straight tension warp members.

2. The reinforcing fabric of claim 1, wherein the central tension warps comprise multifilament yarns having an "S" twist configuration.

3. The reinforcing fabric of claim 1, wherein the central tension warp crimp is from about 3.5% to about 5.5% and the binder warp crimp is from about 27% to about 34%.

4. The reinforcing fabric of claim 1, wherein the binder warps have a size different from the size of the central tension warps.

5. The reinforcing fabric of claim 1, wherein the central tension warps are made from a different material than the binder warps.

6. The reinforcing fabric of claim 5, wherein the central tension warps comprise polyester, and the binder warps comprise nylon.

7. The reinforcing fabric of claim 1, wherein the fabric layer is impregnated with an elastomer.

8. The reinforcing fabric of claim 1, wherein the upper, lower and middle wefts are crimped.

9. A conveyor belt, comprising:
   a first reinforcing fabric layer;
   a top elastomer cover layer; and
   a bottom elastomer cover layer;
   wherein the first reinforcing layer comprises:
   (a) a plurality of substantially parallel middle wefts;
   (b) a plurality of substantially parallel upper and lower wefts positioned above and below said center wefts, the upper and lower wefts being in opposition to each other, the upper and lower wefts further being in non-opposition with the center wefts;
   (c) a plurality of crimped central tension warps positioned transverse to said middle wefts, said central tension warps interlacing each of the middle wefts; and
   (d) a plurality of crimped binder warps interlacing the upper and lower wefts above and below the central tension warps in alternating sequence with at least one of the binder warps interlacing upper and lower wefts other than those interlaced by an adjacent binder warp; and wherein the central tension warp crimp is different from the binder warp crimp and the first reinforcing layer has no straight tension warp members.

10. The conveyor belt of claim 9, wherein the central tension warp crimp is from about 3.5% to about 5.5% and the binder warp crimp is from about 27% to about 34%.

11. The conveyor belt of claim 9, wherein the reinforcing fabric layer is impregnated with an elastomeric material.

12. The conveyor belt of claim 9, further comprising a second reinforcing fabric layer.

13. The conveyor belt of claim 12, wherein the second reinforcing fabric layer comprises the same warp and weft configuration as the first reinforcing fabric layer.

14. The conveyor belt of claim 12, wherein the second reinforcing fabric layer comprises a weave selected from the list consisting of plain weave, twill weave, broken twill weave, leno weave, straight warp weave, crow foot weave, oxford weave, S-weave, and A-weave.

15. The conveyor belt of claim 9, wherein the binder warps have a size different from the size of the central tension warps.

16. The conveyor belt of claim 15, wherein the central tension warps are made from a different material from the middle wefts.

17. The conveyor belt of claim 16, wherein the central tension warps comprise polyester, and the binder warps comprise nylon.

18. The conveyor belt of claim 9, further comprising second and third reinforcing fabric layers having substantially the same warp and weft configuration as the first reinforcing fabric layer.

19. The conveyor belt of claim 9, wherein the upper, lower and middle wefts are crimped.

20. A method of making a conveyor belt structure, comprising:
   (a) providing a first reinforcing fabric layer having:
      (i) a plurality of substantially parallel middle wefts;
      (ii) a plurality of substantially parallel upper and lower wefts positioned above and below said center wefts, the upper and lower wefts being in opposition to each other, the upper and lower wefts further being in non-opposition with the center wefts;
      (iii) a plurality of crimped central tension warps positioned transverse to said middle wefts, said central tension warps interlacing each of the middle wefts; and
      (iv) a plurality of crimped binder warps interlacing the upper and lower wefts above and below the central tension warps in alternating sequence with at least one of the binder warps interlacing upper and lower wefts other than those interlaced by an adjacent binder warp;
   wherein the central tension warp crimp is different from the binder warp crimp and the first reinforcing fabric layer has no straight tension warp members;
   (b) impregnating the reinforcing fabric layer with an elastomer; and
   (c) providing top and bottom elastomer covers.

21. The method of claim 20, further comprising dipping the first reinforcing fabric layer in resorcinol formaldehyde latex (RFL).

22. The method of claim 20, further comprising providing a second reinforcing fabric layer having substantially the same warp and weft configuration as the first reinforcing fabric layer; impregnating the second reinforcing layer with the elastomer; laying the first and second reinforcing fabric layers in adjacent relation to each other; and curing the elastomer to lock the first and second reinforcing fabric layers together.

23. The method of claim 22, further comprising providing a third reinforcing fabric layer having substantially the same warp and weft configuration as the first and second reinforcing fabric layers; impregnating the third reinforcing layer with the elastomer; laying the first, second and third reinforcing fabric layers in adjacent relation to each other; and curing the elastomer to lock the first, second and third reinforcing fabric layers together.

24. The method of claim 20, wherein the central tension warp crimp of the first reinforcing fabric layer is from about 3.5% to about 5.5% and the binder warp crimp is from about 27% to about 34%.

25. The method of claim 24, wherein the central tension warps comprise polyester, and the binder warps comprise nylon.

26. The method of claim 25, wherein the upper, lower and middle wefts are crimped.

* * * * *